(12) United States Patent
Pazhyannur et al.

(10) Patent No.: US 7,142,542 B2
(45) Date of Patent: Nov. 28, 2006

(54) SELECTIVE RETRANSMISSION OF DATA

(75) Inventors: Rajesh S. Pazhyannur, Schaumburg, IL (US); Irfan Ali, Northbrook, IL (US); Nol Rananand, Bankok (TH)

(73) Assignee: Motorola, Inc., Schaumburg, IL (US)

( * ) Notice: Subject to any disclaimer, the term of this patent is extended or adjusted under 35 U.S.C. 154(b) by 937 days.

(21) Appl. No.: 10/003,378

(22) Filed: Nov. 15, 2001

(65) Prior Publication Data

US 2003/0091068 A1  May 15, 2003

(51) Int. Cl.
*H04L 12/56* (2006.01)
(52) U.S. Cl. .................. 370/394; 370/473; 714/748; 714/749
(58) Field of Classification Search ............. 370/428, 370/394, 473, 474, 342, 469; 714/748, 749
See application file for complete search history.

(56) References Cited

U.S. PATENT DOCUMENTS

| | | | | |
|---|---|---|---|---|
| 6,556,556 B1* | 4/2003 | Sen et al. | .................. | 370/342 |
| 6,665,313 B1* | 12/2003 | Chang et al. | ................ | 370/469 |
| 6,795,435 B1* | 9/2004 | Jouppi et al. | ................ | 370/394 |
| 6,895,010 B1* | 5/2005 | Chang et al. | ................ | 370/394 |
| 6,920,152 B1* | 7/2005 | Chang et al. | ................ | 370/474 |
| 7,061,913 B1* | 6/2006 | Abrol et al. | ................. | 370/394 |
| 7,068,658 B1* | 6/2006 | Rezaiifar et al. | ........... | 370/394 |
| 2003/0133408 A1* | 7/2003 | Cheng et al. | ................ | 370/230 |

* cited by examiner

*Primary Examiner*—Chau Nguyen
*Assistant Examiner*—Nguyen Ngo

(57) ABSTRACT

During reception of a higher-layer packet, segmented into lower-layer frames, a receiver will appropriately determine if a lower-layer frame was correctly received. If a lower-layer frame is not correctly received, and the maximum number of NAKs have been sent, the lower-layer frame is categorized as aborted. Once a frame has been categorized as aborted, the receiver determines an RLP frame corresponding to the higher layer packet boundary, sets V(N) to a next missing link-layer frame after a higher-layer packet boundary and pushes frames up to V(N) to the higher layer.

7 Claims, 3 Drawing Sheets

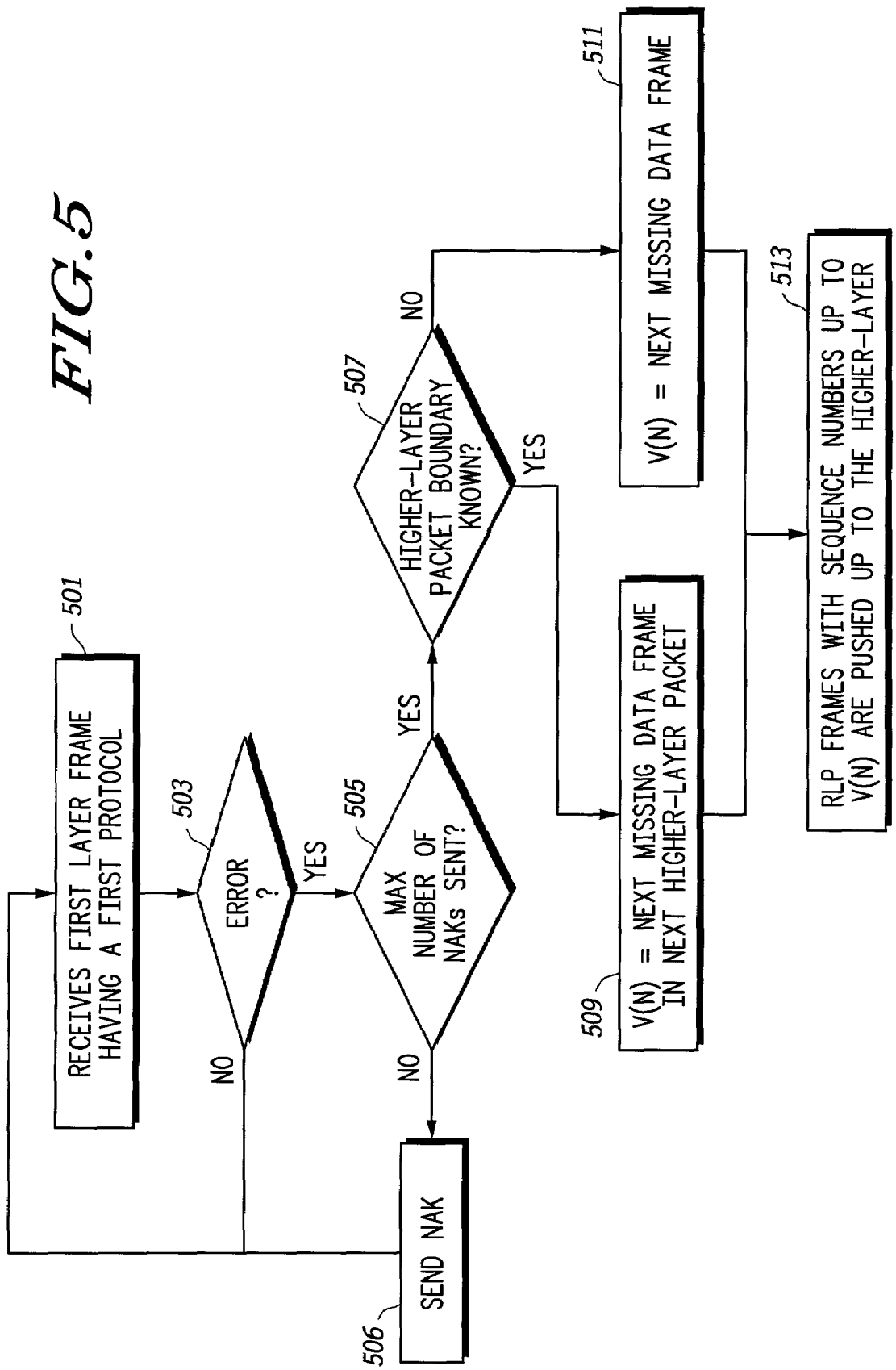

SELECTIVE RETRANSMISSION OF DATA

FIELD OF THE INVENTION

The present invention relates generally to communication systems and in particular, to data re-transmission within such communication systems.

BACKGROUND OF THE INVENTION

In current Code Division Multiple Access (CDMA) communication systems a Radio Link Protocol (RLP) is utilized for the link layer to transport data traffic between a mobile unit and infrastructure equipment. During typical data transmission Point to Point Protocol (PPP) is utilized on top of the RLP. In such situations, RLP fragments PPP packets into 20 millisecond frames that are transmitted over the air. This is illustrated in FIG. 1. As shown, PPP packets 101 are segmented into RLP frames 102 and transmitted over the air.

RLP is a Negative-Acknowledgment (NAK) based protocol in that the receiver does not acknowledge correctly-received RLP frames. RLP only requests the retransmission of RLP frames that were incorrectly received by sending a NAK to the transmitter. Prior to receiving the NAKed frame, subsequently transmitted RLP frames continue to be received. After a predetermined number of NAKs being sent for a particular frame, and if the frame has not been received, the receiver aborts the NAK procedure and passes the incorrectly received RLP frames to the higher layer (PPP).

From the upper-layer's perspective, aborting a frame at the RLP layer is equivalent to aborting the entire PPP packet. This is because PPP reassembles all RLP frames for the PPP packet, and then performs a checksum match for the entire PPP packet. Since the PPP packet contains an errored RLP frame (on account of the RLP abort), the checksum match will fail. A checksum failure results in a PPP packet discard. Thus, even a single aborted RLP frame results in the eventual discard of the upper-layer PPP packet that the aborted RLP frame resides.

Since RLP is octet-based as opposed to packet based, the receiver is unaware of higher layer (PPP) framing. Thus, RLP continues to reliably deliver subsequent frames belonging to the PPP packet even after having aborted on a frame corresponding to the packet. In other words, RLP continues to request retransmission of frames (through NAKs) corresponding to a particular PPP packet, even though PPP will eventually discard the entire PPP packet. The obvious inefficiencies of this approach is that RLP frames belonging to the same PPP packet as the aborted RLP frame are unnecessarily retransmitted. In other words, RLP attempts to deliver RLP frames error-free to the upper layer when they will be discarded nonetheless. Additionally, subsequent PPP packets are unnecessarily delayed in this current RLP process. Therefore, a need exists for a method and apparatus for data re-transmission within a communication system that does not unnecessarily retransmit RLP frames.

BRIEF DESCRIPTION OF THE DRAWINGS

FIG. 5 is a flow chart showing operation of the transceiver of FIG. 4 in accordance with the preferred embodiment of the present invention.

DETAILED DESCRIPTION OF THE DRAWINGS

Figure 1:
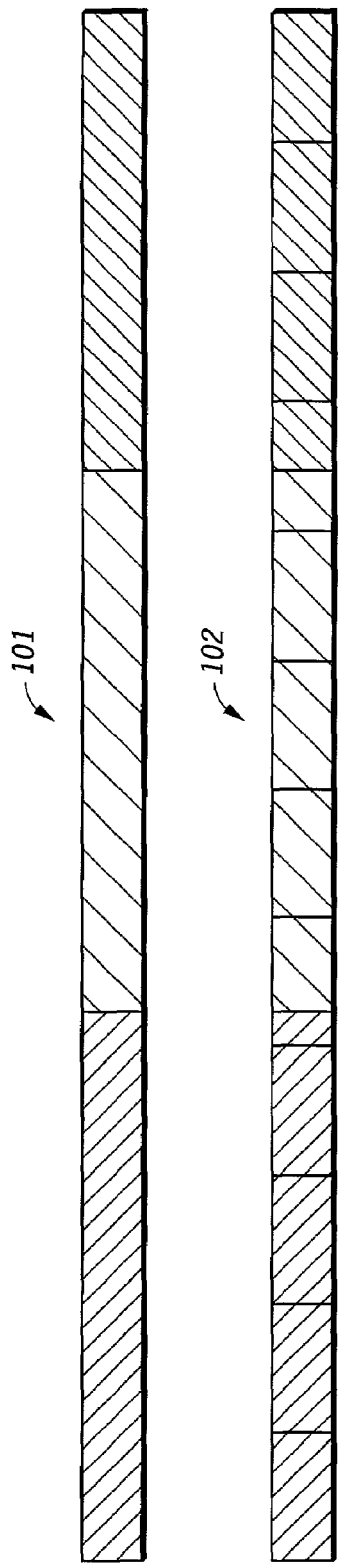
FIG. 1 illustrates data transmission within a communication system.

To address the above-mentioned need, a method and apparatus for retransmitting data is provided herein. During reception of a higher-layer packet segmented into lower-layer frames, the receiver will appropriately determine if a lower-layer frame was correctly received. If a lower-layer frame is not correctly received, and the maximum number of NAKs have been sent, the lower-layer frame is categorized as aborted. Once a frame has been categorized as aborted, the receiver will send no more NAKs for a predetermined number of lower-layer frames. In particular, those lower-layer frames associated with the higher-layer packet will fail to have NAKs sent if they are improperly received.

The present invention encompasses a method for selective retransmission within a communication system wherein higher-layer packets are segmented and transmitted via a link-layer protocol. The method comprises the steps of determining that a link-layer frame needs to be aborted and determining a set of link-layer frames ($\underline{V}(B)$) having higher-layer packet boundaries. Selective retransmission of link-layer frames is accomplished by setting V(N) to a next missing link-layer frame after a higher-layer packet boundary if $\underline{V}(B)$ is not an empty set, otherwise setting V(N) to V(R). In the preferred embodiment of the present invention V(N) is a next link-layer frame needed for sequential delivery of frames and V(R) is a next new link-layer frame expected.

In a communication system where a higher-layer packet is segmented and transmitted over a link layer utilizing a link-layer protocol, the present invention additionally encompasses a method for selective retransmission of data. The method comprises the steps of receiving a link-layer frame, wherein the link-layer frame comprises data from a first higher-layer packet and failing to send a Negative acknowledgment (NAK) for the link-layer frame if a prior-received link-layer frame was aborted, otherwise sending the NAK.

The present invention additionally encompasses an apparatus comprising receiving circuitry having a link-layer frame as an input, the link-layer frame comprising data from a first higher-layer packet, and transmitting circuitry failing to output a Negative Acknowledgment (NAK) for the link-layer frame if a prior-received link-layer frame was aborted, otherwise sending the NAK.

The present invention additionally encompasses an apparatus comprising a receiver having a poorly received link-layer frame as an input, wherein the link-layer frame comprises a segment of a higher-layer data packet. Logic circuitry is provided for determining that the poorly received link-layer frame should be aborted, and setting V(N) to a next missing link-layer frame after a next higher-layer packet boundary if $\underline{V}(B)$ is not an empty set, otherwise setting V(N) to V(R). In the preferred embodiment of the present invention V(N) is a next link-layer frame needed for sequential delivery of frames and V(R) is a next new link-layer frame expected.

Figure 2:
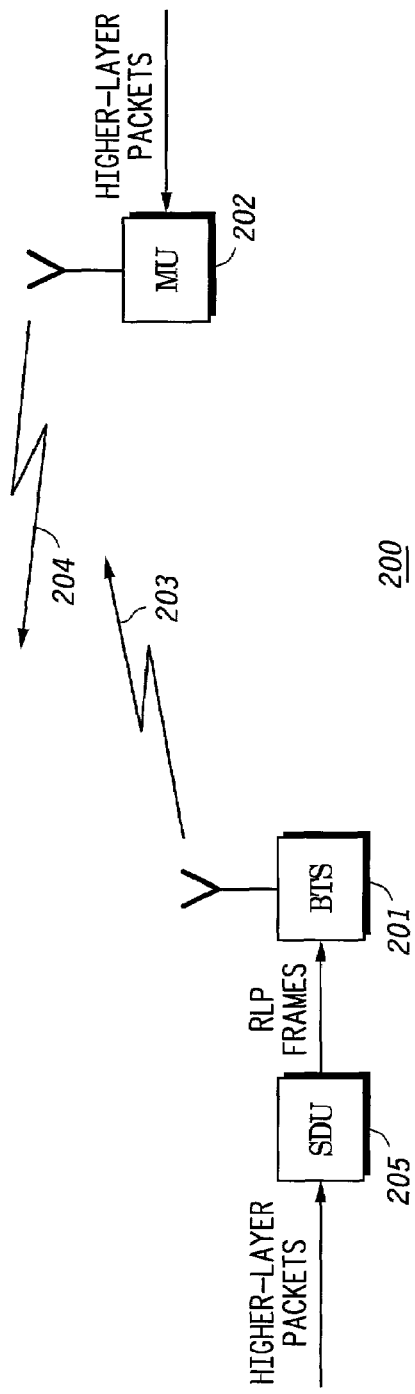
FIG. 2 is a block diagram of a communication system in accordance with the preferred embodiment of the present invention.

Turning now to the drawings, wherein like numerals designate like components, FIG. 2 is a block diagram of communication system 200 in accordance with the preferred embodiment of the present invention. Communication system 200 comprises Selection and Distribution Unit (SDU) 205, Base Transceiver Station (BTS) 201, and Mobile (remote) Unit (MU) 202. Higher-layer packets enter SDU 205 and are appropriately fragmented into RLP frames and passed to transmitting circuitry (BTS 201). The RLP frames are transmitted to remote unit 202 via downlink communication signal 203. Although not shown, one of ordinary skill in the art will recognize that SDU 205 may be coupled to multiple base stations, each transmitting a downlink signal to mobile unit 202. On the reverse link, higher-layer packets enter mobile unit 202 and are appropriately converted to RLP frames, and transmitted via uplink communication signal 204. Although not shown, higher-layer packets entering remote unit 202 may originate from any application residing internal to, or external to remote unit 202.

In the preferred embodiment of the present invention, communication system 200 utilizes a Code Division Multiple Access (CDMA) system protocol as described in Cellular System Remote unit-Base Station Compatibility Standard of the Electronic Industry Association/Telecommunications Industry Association Interim Standard 95C (TIA/EIA/IS-95C). However, in alternate embodiments communication system 200 may utilize other cellular communication system protocols.

Operation of the base station receiver and the mobile unit receiver within communication system 200 occurs as follows: During reception of a higher-layer packet, segmented into RLP frames, the receiver will appropriately determine if an RLP frame was correctly received. If an RLP frame is not correctly received, and the maximum number of NAKs have been sent, the RLP frame is categorized as aborted. Once an RLP frame has been categorized as aborted, the receiver will send no more NAKs for predetermined RLP frames. In particular, those RLP frames associated with the higher-layer packet will fail to have NAKs sent if they are improperly received. This procedure is illustrated in FIG. 3.

Figure 3:
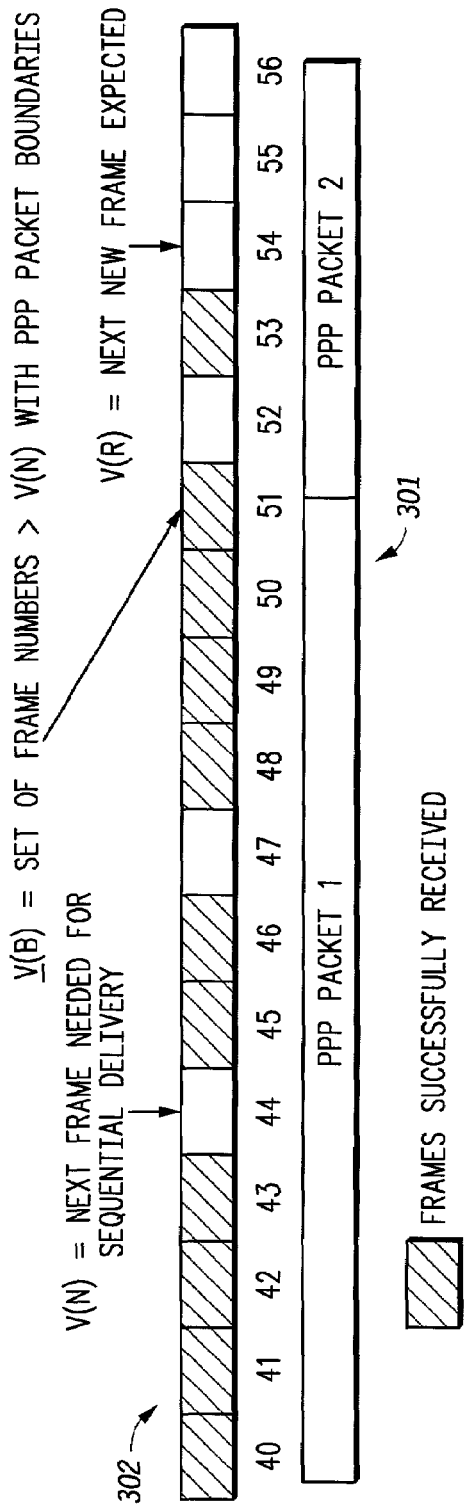
FIG. 3 illustrates data transmission in accordance with the preferred embodiment of the present invention.

As shown in FIG. 3, PPP packets 301 are fragmented into RLP frames 302 for over-the-air transmission. In this example, the first PPP packet is mapped into RLP frames 40–51. As shown, frames 40–43, 45–46, 48–51, and 53 have been successfully received. Because frame 51 has been successfully received, the receiver knows the RLP frame corresponding to the PPP packet boundary. In particular, the PPP packet boundaries are detected by checking for a start flag (typically with a value of 0x7e). The RLP receiver hence is aware of the PPP framing being used. This framing information is provided to the RLP receiver by the PPP layer.

In this example, frame 44 has been aborted. Because of this, the higher layer application will eventually request retransmission of frames 40–51. In the preferred embodiment of the present invention, when a frame is aborted, the receiver determines an RLP frame corresponding to the PPP packet boundary (frame 51), and pushes up frames 40–51 to the higher layer. The receiver is then instructed to send no NAKs for frames 45–50. If the receiver is unable to determine the PPP packet boundary (i.e., if frame 51 has not been received), then the transmitter will push all frames up to the higher layer.

Current RLP defines variables V(N) and V(R), with V(N) being equal to the next frame needed for sequential delivery of frames, and V(R) equal to the next new frame expected from the transmitter. (See IS-707 Section 3.1.2.2). Implementing the above procedure into RLP requires the addition of a vector ($\underline{V}(B)=\{v_1, v_2, \ldots, v_k\}$) indicating a set of RLP frames having higher-layer packet boundaries between V(N) and V(R). In particular, $\underline{V}(B)=\{v_1, v_2, \ldots, v_k\}$ indicates that RLP has detected k PPP packet boundaries having RLP frame values between V(N) and V(R) and $v_1, v_2, \ldots, v_k$ respectively correspond to the RLP frame containing the boundary of packet 1, 2, . . . , k. In the scenario described in FIG. 3, V(N)=44, V(R)=54, and $\underline{V}(B)=\{51\}$. V(N) is a variable that tells the receiver what frames have been received. In particular, all frames<V(N) are tagged as "received" by the receiver, and the receiver will fail to send a NAK for frames having values<V(N). In the preferred embodiment of the present invention, upon an aborted frame, V(N) is set by the receiver based on the following logic.

On an RLP abort V(N) is modified as follows.
    if $\underline{V}(B)$ is not an empty set
        set V(N) to the next missing data frame after $v^1$;
    else if $\underline{V}(B)$ is an empty set
        set V(N) to the sequence number of the next missing data frame.

Once V(N) is modified, all RLP frames with sequence numbers up to V(N) are pushed up to the higher layer.

The above logic results in all frames up to the higher-layer packet boundary ($v_1$) being pushed to the higher layer once an RLP frame is aborted. The above logic also results in the receiver sending no NAKs for poor RLP frames received for the higher-layer packet having the aborted frame. Because of this, frames are not unnecessarily retransmitted when they are poorly received. Additionally, the unnecessary delay resulting from multiple transmissions of RLP frames is greatly reduced.

Figure 4:
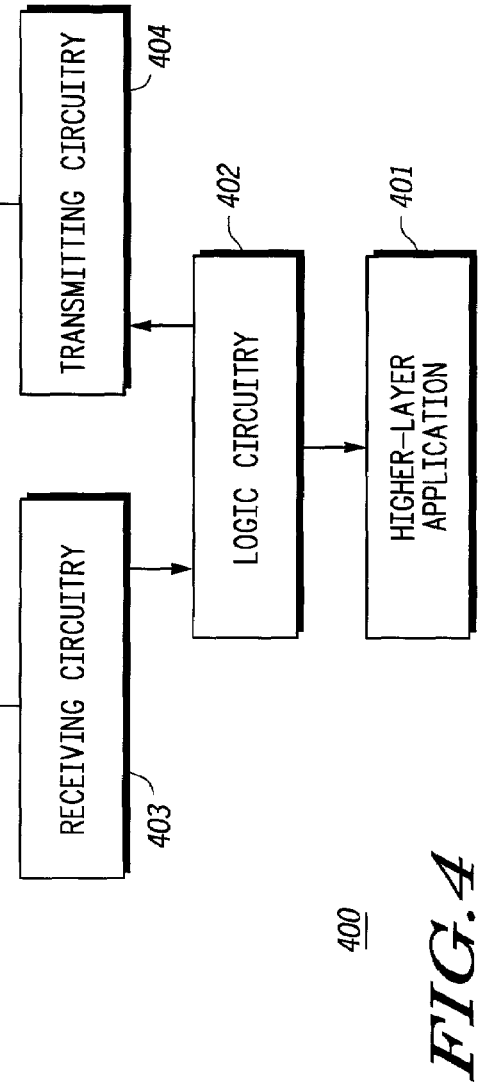
FIG. 4 is a block diagram of a transceiver in accordance with the preferred embodiment of the present invention.

FIG. 4 is a block diagram of transceiving circuitry 400 in accordance with the preferred embodiment of the present invention. One of ordinary skill in the art will recognize that circuitry 400 may be implemented in either BTS 201 or remote unit 202. Operation of transceiver 400 in accordance with the preferred embodiment of the present invention occurs as described in FIG. 5.

The logic flow begins at step 501 where receiving circuitry 403 receives a first link-layer frame. The first link-layer frame comprises data from a higher-layer frame. In the preferred embodiment of the present invention the frame is a link-layer frame having an RLP protocol, the RLP frame comprises data from a higher PPP layer. The RLP frame is passed to logic circuitry 402 where it is analyzed to determine if an error in transmission has occurred (step 503). If, at step 503 it is determined that no error has occurred, the logic flow returns to step 501, otherwise the logic flow continues to step 505 where logic circuitry 402 determines if a maximum number of NAKs for the frame have been previously sent. As discussed above, after a predetermined number of NAKs have been sent for the frame, the frame is identified as aborted, and the NAK process is discontinued. If, at step 505, it is determined that the maximum number of NAKs have not been sent, a NAK is transmitted via transmitting circuitry 404 (step 506) and the logic flow returns to step 501.

Continuing, if at step 505 it is determined that a maximum number of NAKs have been sent (i.e., the frame needs to be aborted), then the frame is identified as aborted and the logic flow continues to step 507. At step 507, logic circuitry 402 determines a set of link-layer frames (V(B)) having higher-layer packet boundaries, and if at least one RLP frame has been identified corresponding to the higher-layer boundary (PPP packet boundary). If this RLP frame has been identified, the logic flow continues to step 509 where V(N) is set to the next missing link-layer frame in the next higher-layer packet, otherwise the logic flow continues to step 511 where V(N) is set to the next missing link-layer frame V(R). As discussed above, setting V(N) as such "fools" the receiver into believing that packets up to V(N) have already been properly received. Because of this, no NAKs will be sent for poor frames received that have frame values <V(N). The logic flow continues to step 513 where all frames up to V(N) are pushed by logic circuitry 402 to higher-layer application 401.

When the higher-layer packet boundary frame is known, the above logic results in all frames up to the higher-layer packet boundary being pushed to the higher layer once an RLP frame is aborted. The above logic also results in the receiver sending no NAKs for poor RLP frames received for the higher-layer packet having the aborted frame since these frames have values less than V(N). Because of this, frames are not unnecessarily retransmitted when the higher layer will request retransmission of the packet. Additionally, the unnecessary delay resulting from multiple transmissions of RLP frames is greatly reduced.

While the invention has been particularly shown and described with reference to a particular embodiment, it will be understood by those skilled in the art that various changes in form and details may be made therein without departing from the spirit and scope of the invention. For example, although the above description was given with PPP as the upper layer, and RLP as the lower layer protocols, one of ordinary skill in the art will recognize that any number of protocols may be utilized. It is intended that such changes come within the scope of the following claims.

The invention claimed is:

1. A method in a receiver for effecting selective retransmission by a transmitter within a communication system wherein packets at a higher layer are segmented and transmitted via a link-layer protocol, the method comprising the steps of:

in the receiver,
  determining in the receiver that a link-layer frame needs to be aborted;
  determining a set of link-layer frames (V(B)) having higher-layer packet boundaries;
  setting V(N) to a next missing link-layer frame after a higher-layer packet boundary if V(B) is not an empty set, otherwise setting V(N) to V(R), wherein V(N) is a frame number of a next link-layer frame needed for sequential deliver of frames and V(R) is a frame number of a next new link-layer frame expected; and
  pushing all frames with sequence numbers up to V(N) up to the higher layer.

2. The method of claim 1 wherein the step of determining that the link-layer frame needs to be aborted comprises the step of determining that an Radio Link Protocol (RLP) frame needs to be aborted, wherein the RLP frame comprises a segment from a higher-layer Point-to-Point Protocol (PPP) packet.

3. The method of claim 1 wherein the step of determining that the link-layer frame needs to be aborted comprises the step of determining that a Radio-Link Protocol (RLP) frame needs to be aborted.

4. The method of claim 1 wherein the step of determining a set of link-layer frames having higher-layer packet boundaries comprises the step of determining a set of link-layer frames having Point-to-Point Protocol (PPP) packet boundaries.

5. An apparatus comprising:
  a receiver having a poorly received link-layer frame as an input, wherein the link-layer frame comprises a segment of a higher-layer data packet; and
  logic circuitry determining that the poorly received link-layer frame should be aborted; determining a set of link-layer frames (V(B)) having higher-layer packet boundaries; setting V(N) to a next missing link-layer frame after a next higher-layer packet boundary if V(B) is not an empty set, otherwise setting V(N) to V(R), wherein V(N) is a frame number of a next link-layer frame needed for sequential deliver of frames and V(R) is a frame number of a next new link-layer frame expected; and pushing all frames with sequence numbers up to V(N) up to the higher layer.

6. The apparatus of claim 5 wherein the higher-layer data packet comprises a PPP packet.

7. The apparatus of claim 5 wherein the poorly received link-layer packet comprises a poorly-received RLP packet.

* * * * *